US010546252B2

(12) United States Patent
Chandrasekaran et al.

(10) Patent No.: US 10,546,252 B2
(45) Date of Patent: Jan. 28, 2020

(54) DISCOVERY AND GENERATION OF ORGANIZATIONAL KEY PERFORMANCE INDICATORS UTILIZING GLOSSARY REPOSITORIES

(75) Inventors: Swaminathan Chandrasekaran, Coppell, TX (US); Lakshminarayanan Krishnamurthy, Round Rock, TX (US); Christopher L. Walk, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 418 days.

(21) Appl. No.: 13/423,343

(22) Filed: Mar. 19, 2012

(65) Prior Publication Data

US 2013/0246129 A1 Sep. 19, 2013

(51) Int. Cl.
*G06Q 10/06* (2012.01)

(52) U.S. Cl.
CPC .................... *G06Q 10/06* (2013.01)

(58) Field of Classification Search
CPC ....................................................... G06Q 10/06
See application file for complete search history.

(56) References Cited

U.S. PATENT DOCUMENTS

| 5,303,166 | A * | 4/1994 | Amalfitano et al. ........... 702/186 |
| 5,446,874 | A * | 8/1995 | Waclawsky et al. ............. 714/1 |
| 6,336,138 | B1 | 1/2002 | Caswell et al. |
| 6,381,558 | B1 * | 4/2002 | Berry et al. ................... 702/186 |
| 6,877,034 | B1 * | 4/2005 | Machin et al. ................ 709/223 |
| 7,188,169 | B2 * | 3/2007 | Buus et al. .................... 709/224 |
| 7,233,910 | B2 * | 6/2007 | Hileman et al. .............. 705/7.38 |
| 7,346,529 | B2 * | 3/2008 | Flores .......................... 705/7.36 |
| 7,401,142 | B2 * | 7/2008 | Childress et al. ............. 709/224 |
| 7,509,308 | B2 * | 3/2009 | Huang et al. |
| 7,587,665 | B2 * | 9/2009 | Crow et al. ................... 715/212 |
| 7,590,552 | B2 * | 9/2009 | Barker et al. ................ 705/7.23 |

(Continued)

FOREIGN PATENT DOCUMENTS

| WO | WO 02/102097 A1 * | 12/2002 | ............... H04Q 7/20 |
| WO | WO-02102097 A1 * | 12/2002 | ............. G06Q 30/02 |

OTHER PUBLICATIONS

Epstein, Marc, Implementingn Corporate Startegy: From Tableaux de Bord to Balanced Scorecards Eurpoean Management Journal, vol. 16, No. 2, 1998.*

(Continued)

*Primary Examiner* — Amanda Gurski
(74) *Attorney, Agent, or Firm* — Christopher Pignato; Andrew M. Calderon; Roberts Mlotkowski Safran Cole & Calderon, P.C.

(57) ABSTRACT

A method for providing discovery and realization of business measurement concepts may include providing at least one interface configured to receive an input from an operator associated with an organization, determining a selected set of glossary terms from a repository including a plurality of glossaries based at least in part on the input where the glossaries relate to different performance indicator components that are combinable to define a measurable performance indicator, and generating at least one performance indicator of the organization based on the selected set of glossary terms.

24 Claims, 4 Drawing Sheets

(56) References Cited

U.S. PATENT DOCUMENTS

| | | | |
|---|---|---|---|
| 7,711,670 B2* | 5/2010 | Roediger | 706/46 |
| 7,716,253 B2* | 5/2010 | Netz et al. | 707/803 |
| 7,769,622 B2* | 8/2010 | Reid et al. | 705/7.42 |
| 7,783,694 B2* | 8/2010 | Perng et al. | 708/422 |
| 7,822,662 B2* | 10/2010 | Guzik et al. | 705/35 |
| 7,831,464 B1* | 11/2010 | Nichols et al. | 705/7.39 |
| 7,848,947 B1* | 12/2010 | McGloin et al. | 705/7.42 |
| 7,895,152 B2* | 2/2011 | Huang et al. | 707/602 |
| 7,908,161 B2* | 3/2011 | Benayon | G06Q 10/04 705/7.11 |
| 7,937,319 B2* | 5/2011 | Kennis et al. | 705/38 |
| 7,941,296 B2* | 5/2011 | Fluegge et al. | 702/186 |
| 7,945,472 B2* | 5/2011 | Pappas et al. | 705/7.31 |
| 7,957,993 B2* | 6/2011 | MacGregor | 705/7.11 |
| 7,992,126 B2* | 8/2011 | MacGregor | 717/102 |
| 8,055,375 B2* | 11/2011 | Pingel et al. | 700/173 |
| 8,095,414 B2* | 1/2012 | Silvera et al. | 705/7.38 |
| 8,095,417 B2* | 1/2012 | Handy | G06Q 10/00 705/7.39 |
| 8,126,750 B2* | 2/2012 | Tien et al. | 705/7.11 |
| 8,140,383 B2* | 3/2012 | Busch | 705/7.38 |
| 8,204,900 B2* | 6/2012 | Gatton et al. | 707/769 |
| 8,209,218 B1* | 6/2012 | Basu et al. | 705/7.39 |
| 8,209,360 B2* | 6/2012 | Tomaszewski | 707/803 |
| 8,266,148 B2* | 9/2012 | Guha | G06F 16/9535 707/737 |
| 8,276,115 B2* | 9/2012 | Bates et al. | 717/106 |
| 8,346,597 B2* | 1/2013 | Waldron et al. | 705/7.41 |
| 8,423,638 B2* | 4/2013 | Moehler et al. | 709/224 |
| 2001/0053993 A1* | 12/2001 | McLean et al. | 705/10 |
| 2002/0078175 A1* | 6/2002 | Wallace et al. | 709/219 |
| 2002/0165750 A1* | 11/2002 | Fouquet | 705/8 |
| 2002/0194329 A1* | 12/2002 | Alling | 709/224 |
| 2003/0050814 A1* | 3/2003 | Stoneking et al. | 705/7 |
| 2003/0061225 A1* | 3/2003 | Bowman et al. | 707/100 |
| 2003/0110249 A1* | 6/2003 | Buus et al. | 709/224 |
| 2003/0149613 A1* | 8/2003 | Cohen et al. | 705/11 |
| 2003/0182181 A1* | 9/2003 | Kirkwood et al. | 705/11 |
| 2004/0032420 A1* | 2/2004 | Allen et al. | 345/700 |
| 2004/0068431 A1* | 4/2004 | Smith et al. | 705/10 |
| 2004/0098358 A1* | 5/2004 | Roediger | 706/46 |
| 2004/0148285 A1* | 7/2004 | Hurd et al. | 707/9 |
| 2004/0172272 A1* | 9/2004 | Shillinglaw et al. | 705/1 |
| 2004/0243462 A1* | 12/2004 | Stier | 705/11 |
| 2005/0033631 A1* | 2/2005 | Wefers et al. | 705/10 |
| 2005/0075915 A1 | 4/2005 | Carlson | |
| 2005/0091102 A1* | 4/2005 | Retsina | 705/10 |
| 2005/0216831 A1* | 9/2005 | Guzik et al. | 715/513 |
| 2006/0010164 A1* | 1/2006 | Netz et al. | 707/104.1 |
| 2006/0212791 A1* | 9/2006 | Crow et al. | 715/503 |
| 2006/0235778 A1* | 10/2006 | Razvi et al. | 705/35 |
| 2006/0241992 A1* | 10/2006 | Yaskin et al. | 705/8 |
| 2007/0022115 A1* | 1/2007 | Warburton | G06F 17/2765 |
| 2007/0174228 A1* | 7/2007 | Folting et al. | 707/1 |
| 2007/0283326 A1* | 12/2007 | Consolatti et al. | 717/124 |
| 2008/0027769 A1* | 1/2008 | Eder | 705/7 |
| 2008/0109270 A1* | 5/2008 | Shepherd et al. | 705/7 |
| 2008/0312986 A1* | 12/2008 | Braun et al. | 705/7 |
| 2009/0063221 A1* | 3/2009 | Jonath et al. | 705/7 |
| 2009/0064025 A1* | 3/2009 | Christ et al. | 715/714 |
| 2009/0099862 A1* | 4/2009 | Fireman et al. | 705/2 |
| 2009/0105981 A1* | 4/2009 | Gozzi | 702/81 |
| 2009/0112932 A1* | 4/2009 | Skierkowski et al. | 707/104.1 |
| 2009/0192867 A1* | 7/2009 | Farooq et al. | 705/10 |
| 2009/0281845 A1* | 11/2009 | Fukuda et al. | 705/7 |
| 2010/0023362 A1* | 1/2010 | Nguyen et al. | 705/7 |
| 2010/0114899 A1* | 5/2010 | Guha et al. | 707/741 |
| 2010/0131544 A1* | 5/2010 | Kilgour | G06F 17/248 707/769 |
| 2010/0250314 A1 | 9/2010 | Channabasavaiah et al. | |
| 2011/0191128 A1* | 8/2011 | Chao et al. | 705/7.11 |
| 2011/0191143 A1* | 8/2011 | Chao et al. | 705/7.36 |
| 2011/0313817 A1* | 12/2011 | Wang | 705/7.39 |
| 2012/0180108 A1* | 7/2012 | Siklos et al. | 726/3 |

OTHER PUBLICATIONS

Silk, Scott, Automating the Balanced Scorecard Management Accounting, vol. 79, No. 11, May 1998.* del-Rio-Ortega et al., Towards Modeling and Tracing Key Performance Indicators in Business Process Journal of Software Datbases, vol. 3, No. 3, 2009.* del-Rio-Ortega, Adela et al., Defining Process Performance Indicators: An Ontological Approach OTM 2010, Par I, LNCS 6426, 2010.*

Norton, David, SAP Strategic Enterprise Management: Translating Stategy into Action: The Balanced Scorcard SAP, Inc., May 1999.* iDashes.net Web Pages iDashes, Inc., May 2001, Retrieved from Archive.org, Jan. 25, 2007.*

Ergometrics.com Web Pages Ergometrics, Mar. 2000, Retrieved from Archive.org Jan. 25, 2007.*

Microsoft Office Business Scorecard Managmer 2005 Microsoft, 2003.*

Popova, Viara et al., Modeling Organizational Performance Indicators 2006.*

Pedrinaci, Carlos et al., Ontology-based metrics computation for business process analysis Fourth International Workshop on Semantic Business Process Managmenet, SBPM'09, Jun. 1, 2009.*

Pedrinaci, Carlos et al., Sentinel: A Semantic Business Process Monitoring Tool ACM, OBI'08, Oct. 2008.*

Castellanos, Malu et al., iBOM: A Platform for Intelligent Business Operation Management Proceedings of the 21$^{st}$ International Conference on Data Engineering (ICDE 2005), 2005.*

Cordys Business Process Management Suite—brochure Cordys Software, 2007.*

Casati, Fabio et al., Enterprise Cockpit for Business Operations Management Springer-Verlag, ER 2004.*

Guo-Shang, Tian et al., An Improved Framework of Business Process Management System Which Integrating Strategy Management, 2008 International Conference on Management Science & Engineering, Sep. 10-12, 2008.*

Koster, Stefan R. et al., An Evaluation Framework for Business Process Management Products University of Twente, 2007.*

Koster, Stefan R., An Evaluation method for Business Process Management Products Capgemini, May 2009.*

Klapper, Larry S. et al., Supply Chain Management: A Recommnded Performance Measurement Scorecard Logistics Management Institute, Jun. 1999.*

Systar First to Unveil Read-to-Implement Business Process Performance Management Solutions PR Newswire, May 14, 2001.*

BusinessObjects Dashboard Builder—User Guide Business Objects, 2008.*

Visual Mining Launches NetCharts Performance Dashboards for Business Users PR Newswire, Feb. 10, 2009.*

Castellanos, Malu et al., iBOM: A Platform for Intelligent Business Operation Management, 2005, Proceedings of the 21st International Conference on Data Engineering (Year: 2005).*

Wedemeijer, L.; "Defining metrics for conceptual schema evolution"; Database Schema Evolution & Meta-Modeling 9th Int'l Workshop on Foundations of Models & Languages for Data & Objects; pp. 220-244; 2001.

Anonymous; "Multiple Platforms Analytic Logical Data Model for Advertising and Marketing Industry"; http://priorartdtabase.com/IPCOM/000202760; Dec. 29, 2010.

Anonymous; "Method and System for Representation of Industry Standard Concepts for Semantic Modeling"; http://priorartdatabase.com/IPCOM/000197637; Jul. 19, 2010.

Kompella, K.-et al.; "Virtual Private LAN Service (VPLS) Using BGP for Auto-Discovery and Signaling"; http://www.ip.com/pubview/IPCOM000145436D; Jan. 1, 2007.

* cited by examiner

DISCOVERY AND GENERATION OF ORGANIZATIONAL KEY PERFORMANCE INDICATORS UTILIZING GLOSSARY REPOSITORIES

BACKGROUND

Example embodiments generally relate to organizational management technology and, more particularly, relate to a mechanism by which software may be provided to assist in setting up processes for measuring and/or monitoring progress relative to organizational objectives and goals.

SUMMARY

Some example embodiments may provide a relatively automated feature by which discovery and realization of business measurement concepts may be accomplished to enable monitoring relative to organizational goals and/or objectives. In this regard, for example, one example embodiment may include a method for providing discovery and realization of business measurement concepts is provided. The method may include providing at least one interface configured to receive an input from an operator associated with an organization, determining a selected set of glossary terms from a repository including a plurality of glossaries based at least in part on the input where the glossaries relate to different performance indicator components that are combinable to define a measurable performance indicator, and generating at least one performance indicator of the organization based on the selected set of glossary terms.

In another example embodiment, an apparatus for providing discovery and realization of business measurement concepts is provided. The apparatus may include processing circuitry configured for providing at least one interface configured to receive an input from an operator associated with an organization, determining a selected set of glossary terms from a repository including a plurality of glossaries based at least in part on the input where the glossaries relate to different performance indicator components that are combinable to define a measurable performance indicator, and generating at least one performance indicator of the organization based on the selected set of glossary terms.

In another example embodiment, a computer program product for providing discovery and realization of business measurement concepts is provided. The computer program product may include a computer-readable storage medium having computer-executable program code instructions stored therein. The computer-executable program code instructions may include program code instructions for providing at least one interface configured to receive an input from an operator associated with an organization, determining a selected set of glossary terms from a repository including a plurality of glossaries based at least in part on the input where the glossaries relate to different performance indicator components that are combinable to define a measurable performance indicator, and generating at least one performance indicator of the organization based on the selected set of glossary terms.

BRIEF DESCRIPTION OF THE SEVERAL VIEWS OF THE DRAWINGS

Figure 1:
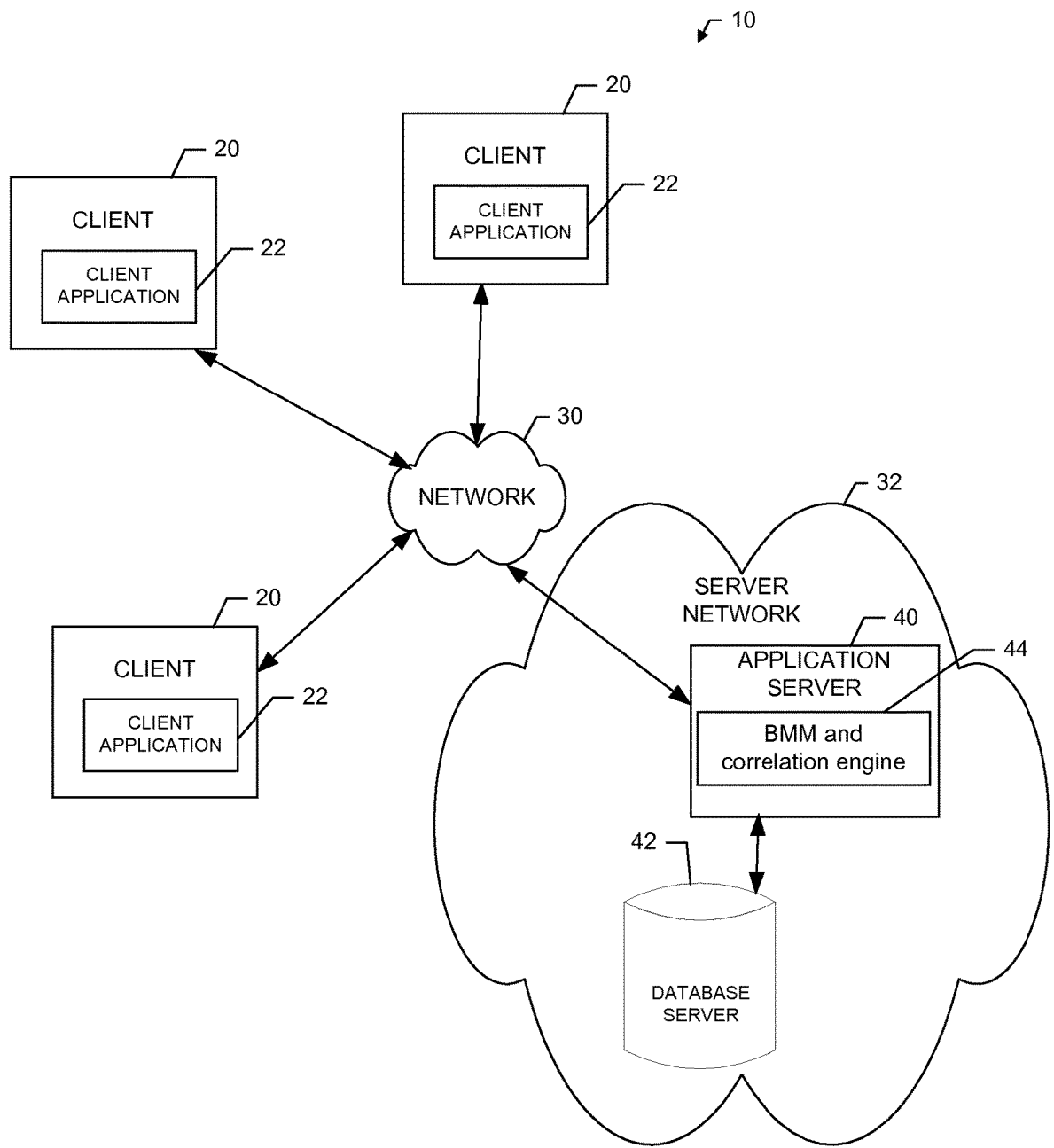
Figure 2:
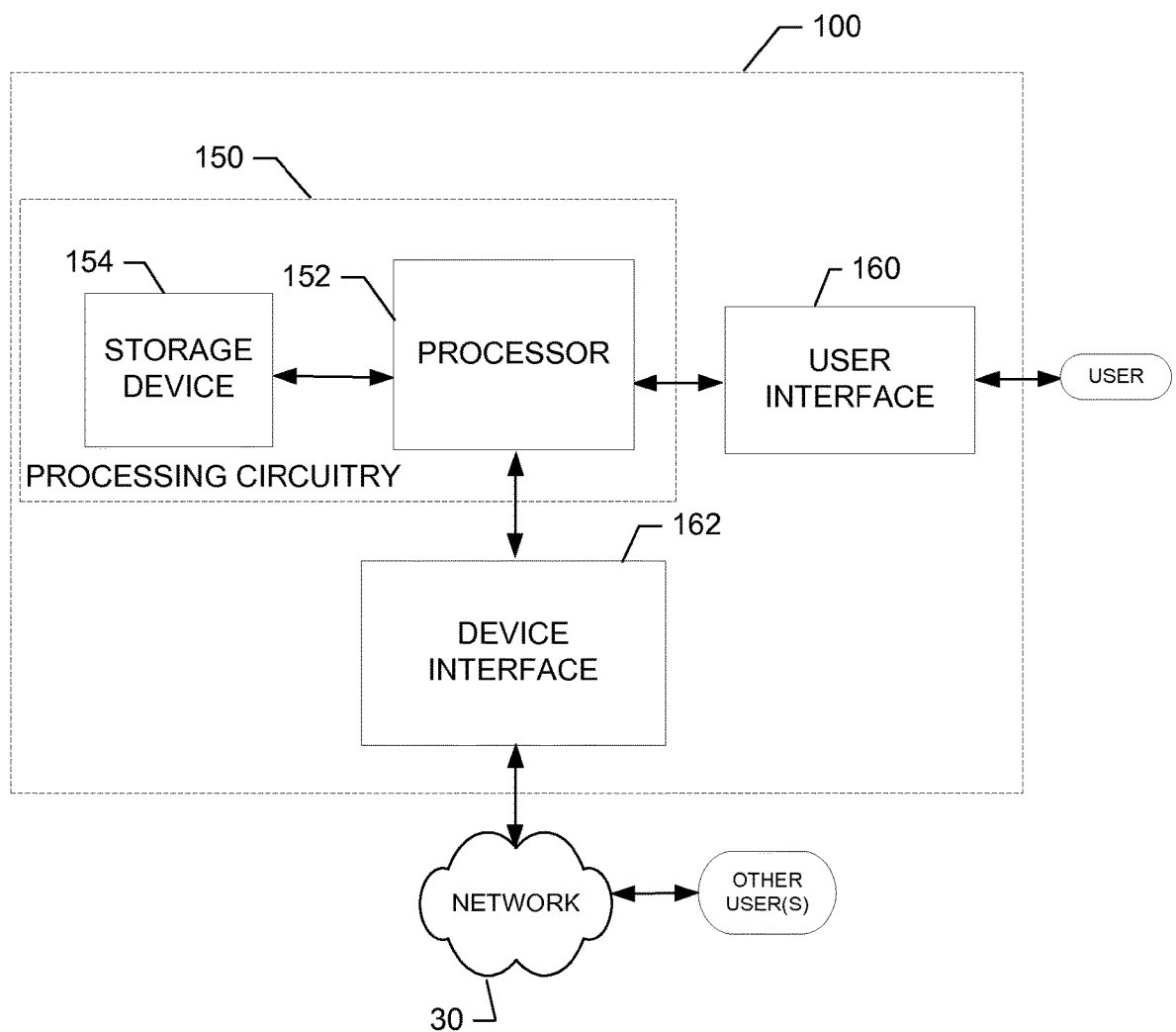
Figure 3:
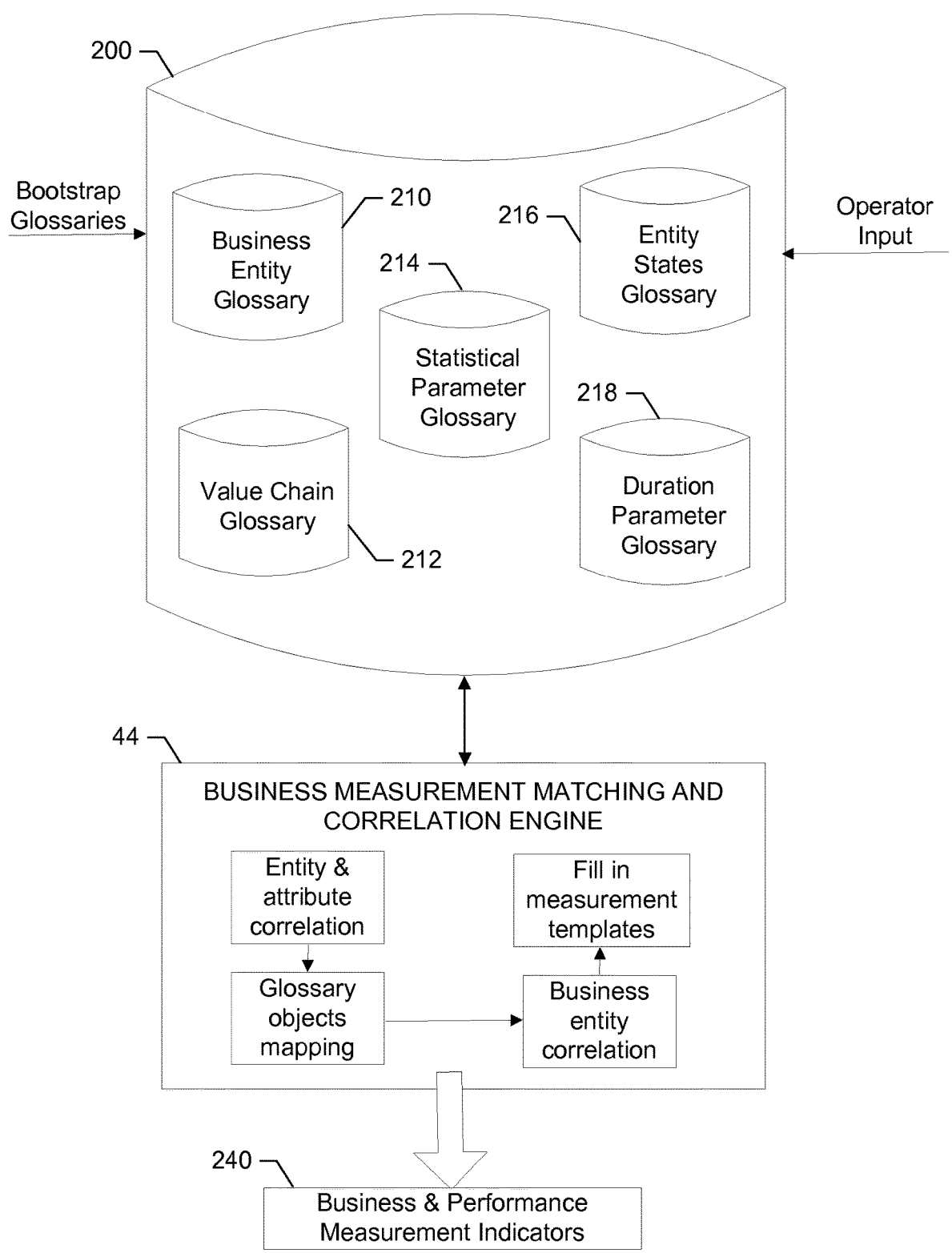
Figure 4:
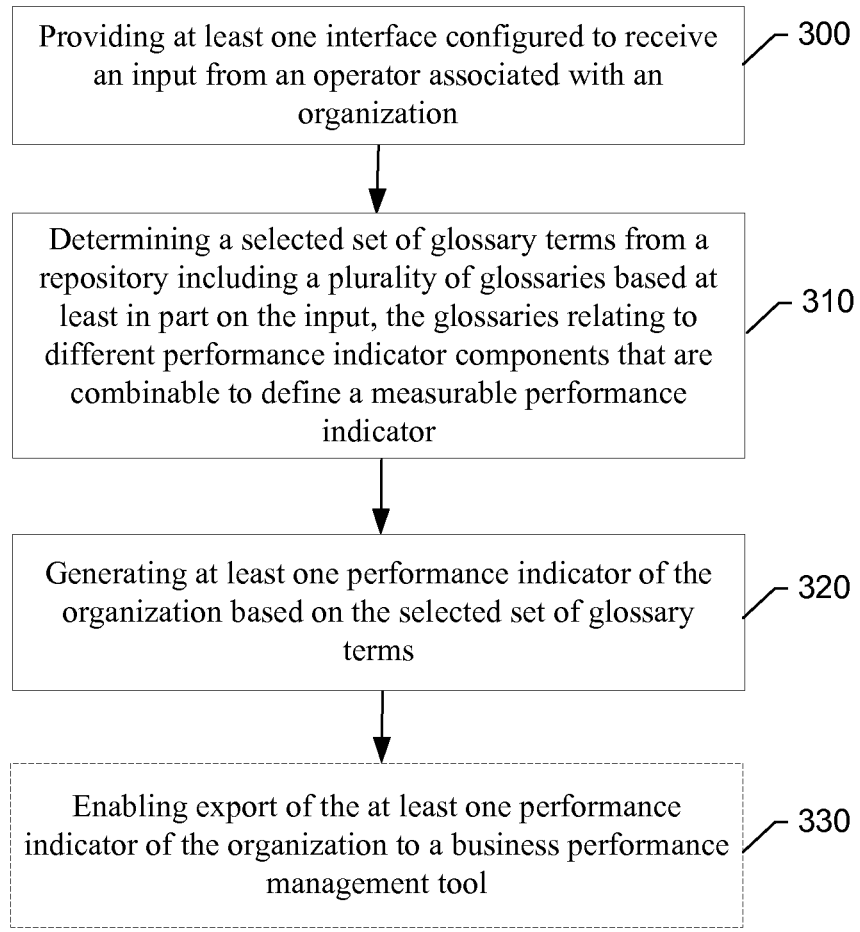

Having thus described the invention in general terms, reference will now be made to the accompanying drawings, which are not necessarily drawn to scale, and wherein:

FIG. 1 illustrates a functional block diagram of a system for providing discovery and realization of business measurement concepts according to an example embodiment;

FIG. 2 illustrates a functional block diagram of an apparatus for providing discovery and realization of business measurement concepts according to an example embodiment;

FIG. 3 is a conceptual block diagram illustrating operation of an apparatus for providing discovery and realization of business measurement concepts according to an example embodiment; and FIG. 4 illustrates a block diagram showing operations associated with a method for providing discovery and realization of business measurement concepts according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Business Process Management (BPM) typically employs management and measurement of key business processes to assist an organization in achieving a set of pre-selected goals and Key Performance Indicators using a combination of activities, metrics and business data. The effective use of BPM may often require the organization to define business models, perform operational and financial planning, collect and analyze data, and identify and monitor key performance indicators (KPI). KPI define a set of values against which the organization can measure itself. KPI may take the form of any of a number of different classes of indicators including, for example, quantitative indicators, practical indicators, directional indicators, actionable indicators, financial indicators, and/or the like. As can be appreciated simply from the number of different classes of indicators, an organization may choose to measure itself relative to any of a massive amount of potential indicators. Coming up with a useful set of KPI can be a key part of employing BPM, but can also be a laborious task.

In many cases, organizations may employ large and costly studies, meetings, and other manually implemented activities in order to attempt to isolate a set of relevant KPIs. In large organizations, it may also be difficult to settle on KPIs due to disagreements in the relevance of certain parameters, or due to differences in terminology or measurement techniques. Thus, some KPIs may be missed, or may even be redundant. Even when problems are not encountered, however, the process of defining KPIs is generally not standardized and is a complicated manual process.

Some example embodiments may provide process level or activity level solutions to standardizing the creation of BPM tools for organizations in a relatively automated way. However, example embodiments do not merely use computing tools to automate functions that were previously done manually. Instead, example embodiments provide a platform configured to be employed by an organization in order to enable the organization to step through the development of a personalizable performance indicators for use in a BPM tool that can track progress relative to goals, KPIs and/or the like that are relevant to the organization by using a plurality of glossaries. A correlation engine may also be employed to utilize operator feedback from the organization in order to generate business and performance measurement indicators that are tailored to the organization via utilization of the glossaries. Accordingly, example embodiments may be enabled to provide discovery and realization (e.g., in an automatic or semi-automatic fashion) of business measurement concepts for use in BPM.

FIG. 1 illustrates an example system in which an embodiment of the present invention may be employed. As shown in FIG. 1, a system 10 according to an example embodiment may include one or more client devices (e.g., clients 20). Notably, although FIG. 1 illustrates three clients 20, it should be appreciated that many more clients 20 may be included in some embodiments and thus, the three clients 20 of FIG. 1 are simply used to illustrate a multiplicity of clients 20 and the number of clients 20 is in no way limiting to other example embodiments. In this regard, example embodiments are scalable to inclusion of any number of clients 20 being tied into the system 10.

The clients 20 may, in some cases, each be computing devices associated with different individuals, locations or entities within an organization. For example, among the clients 20, one client may be associated with a first facility or location of a first organization. Meanwhile, a second client may be associated with a second facility or location of the first organization. However, in some embodiments, each of the clients 20 may be associated with individuals, locations or entities associated with different organizations. As such, for example, some of the clients 20 may be associated with the first organization, while other ones of the clients 20 are associated with a second organization.

Each one of the clients 20 may include or otherwise be embodied as a computing device (e.g., a computer, a network access terminal, a personal digital assistant (PDA), cellular phone, smart phone, or the like) capable of communication with a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients as described below. In an example embodiment, one or more of the clients 20 may include a client application 22 including software for enabling a respective one of the clients 20 to communicate with the network 30 for requesting and/or receiving information and/or services via the network 30. The information or services receivable at the client applications 22 may include deliverable components (e.g., downloadable software to configure the clients 20, or information for consumption or utilization at the clients 20).

The network 30 may be a data network, such as a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols. As such, for example, the network 30 may form a cloud computing environment.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of a service. The cloud model may include at least five characteristics, at least three service models and at least four deployment models.

Some of the characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

In an example embodiment, devices to which the clients 20 may be coupled via the network 30 may include a server network 40 including one or more application servers (e.g., application server 40), and/or a database server 42, which together may form respective elements of a server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 and the database server 42 may each include hardware and/or software for configuring the application server 40 and the database server 42, respectively, to perform various functions. As such, for example, the application server 40 may include processing logic and memory enabling the application server 40 to access and/or execute stored computer readable instructions for performing various functions. In an example embodiment, one function that may be provided by the application server 40 may be the provision of tools for discovery and realization of business measurement concepts using industry models as described herein. For example, the application server 40 may be configured to provide clients 20 with access to the tools by executing the tools from the cloud, or by enabling the clients 20 to download the tools and execute the tools locally. Thus, in some cases, the client application 22 may be an instance of the tools described herein. However, as indicated above, the tools may instead be instantiated at the application server 40 and access glossaries stored in the database server 42 for cloud-based execution of some example embodiments.

In some embodiments, for example, the application server 40 may therefore include an instance of a business measurement matching and correlation engine 44 comprising stored instructions for handling activities associated with practicing example embodiments as described herein. As such, in some embodiments, the clients 20 may access the business measurement matching and correlation engine 44 online and utilize the services provided thereby. However, it should be appreciated that in other embodiments, the business measurement matching and correlation engine 44 may be provided from the application server 40 (e.g., via download over the network 30) to one or more of the clients 20 to enable recipient clients to instantiate an instance of the business measurement matching and correlation engine 44 for local operation. As yet another example, the content manager 44 may be instantiated at one or more of the clients 20 responsive to downloading instructions from a removable or transferable memory device carrying instructions for instantiating the business measurement matching and correlation engine 44 at the corresponding one or more of the clients 20.

In an example embodiment, the application server 40 may include or have access to memory (e.g., internal memory or the database server 42) for storing instructions or applications for the performance of various functions and a corresponding processor for executing stored instructions or applications. For example, the memory may store an instance of the business measurement matching and correlation engine 44 configured to operate in accordance with an example embodiment of the present invention. In this regard, for example, the business measurement matching and correlation engine 44 may include software for enabling the application server 40 to communicate with the network 30 and/or the clients 20 for the provision and/or receipt of information associated with performing activities as described herein. Moreover, in some embodiments, the application server 40 may include or otherwise be in communication with an access terminal (e.g., a computer including a user interface) via which enterprise managers may interact with, configure or otherwise maintain the system 10. In an example embodiment, the enterprise managers may be associated with a particular organization seeking to engage in BPM.

Referring now to FIG. 2, an apparatus 100 for provision of tools for discovery and realization of business measurement concepts using industry models is provided. The apparatus 100 may be a cloud computing node, in some embodiments. However, since not all embodiments are necessarily practiced in a cloud computing environment, it should be appreciated that the apparatus 100 is not necessarily a cloud computing node in all example embodiments. The apparatus 100 may be an embodiment of the business measurement matching and correlation engine 44 or a device hosting the business measurement matching and correlation engine 44. In some embodiments, the apparatus 100 may be a personal computer system, server computer system, thin client, thick client, handheld or laptop device, multiprocessor system, microprocessor-based system, set top box, programmable consumer electronic device, network PC, mini-computer system, mainframe computer system, distributed cloud computing environment that includes and of the above systems or devices, and/or the like. The apparatus 100 may function, according to its configuration, as any of a number of different entities. As such, configuration of the apparatus 100 as described herein may transform the apparatus 100 into the business measurement matching and correlation engine 44. In some cases, configuration of the apparatus 100 may be accomplished via executable instructions such as program modules executed by a computer system. The program modules may include routines, programs, objects, components, logic, data structures, and so on that perform particular tasks or implement particular abstract data types.

In an example embodiment, the apparatus 100 may include or otherwise be in communication with processing circuitry 150 that is configured to perform data processing, application execution and other processing and management services according to an example embodiment of the present invention. In one embodiment, the processing circuitry 150 may include a storage device 154 and a processor 152 (which may itself include one or more processors) that may be in communication with or otherwise control a user interface 160 and a device interface 162. As such, the processing circuitry 150 may be embodied as a circuit chip (e.g., an integrated circuit chip) configured (e.g., with hardware, software or a combination of hardware and software) to perform operations described herein. However, in some embodiments, the processing circuitry 150 may be embodied as a portion of a server, computer, laptop, workstation or even one of various mobile computing devices. In situations where the processing circuitry 150 is embodied as a server or at a remotely located computing device, the user interface 160 may be disposed at another device (e.g., at a computer terminal or network access terminal) that may be in communication with the processing circuitry 150 via the device interface 162 and/or a network (e.g., network 30).

Internal communication among components of the apparatus 100 may be accomplished via a communication bus. Such a communication bus may represent one or more of several types of bus structures, including a memory bus or memory controller, a peripheral bus, an accelerated graphics port, and a processor or local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The user interface 160 may be in communication with the processing circuitry 150 to receive an indication of a user input at the user interface 160 and/or to provide an audible, visual, mechanical or other output to the user. As such, the user interface 160 may include, for example, a keyboard, a mouse, a joystick, a display, a touch screen, a microphone, a pointing device, a speaker, or other input/output mechanisms. In embodiments where the apparatus is embodied at a server or other network entity, the user interface 160 may be limited or even eliminated in some cases. Alternatively, as indicated above, the user interface 160 may be remotely located.

The device interface 162 may include one or more interface mechanisms for enabling communication with other devices and/or networks. In some cases, the device interface 162 may be any means such as a device or circuitry embodied in either hardware, software, or a combination of hardware and software that is configured to receive and/or transmit data from/to a network and/or any other device or module in communication with the processing circuitry 150. In this regard, the device interface 162 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 162 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 154 may include one or more non-transitory storage or memory devices such as, for example, volatile and/or non-volatile memory that may be either fixed or removable. As such, the storage device 154 may include random access memory (RAM) and/or cache memory. In some embodiments, the storage device 154 may be a magnetic disk drive or an optical disk drive (e.g., CD ROM, DVD ROM and/or the like). The storage device 154 may be configured to store information, data, applications, program modules, instructions or the like for enabling the apparatus to carry out various functions in accordance with example embodiments of the present invention. For example, the storage device 154 could be configured to buffer input data for processing by the processor 152. Additionally or alternatively, the storage device 154 could be configured to store instructions for execution by the processor 152. As yet another alternative, the storage device 154 may include one of a plurality of databases that may store a variety of files, contents or data sets. Among the contents of the storage device 154, applications may be stored for execution by the processor 152 in order to carry out the functionality associated with each respective application.

The processor 152 may be embodied in a number of different ways. For example, the processor 152 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 152 may be configured to execute instructions stored in the storage device 154 or otherwise accessible to the processor 152. As such, whether configured by hardware or software methods, or by a combination thereof, the processor 152 may represent an entity (e.g., physically embodied in circuitry) capable of performing operations according to embodiments of the present invention while configured accordingly. Thus, for example, when the processor 152 is embodied as an ASIC, FPGA or the like, the processor 152 may be specifically configured hardware for conducting the operations described herein. Alternatively, as another example, when the processor 152 is embodied as an executor of software instructions, the instructions may specifically configure the processor 152 to perform the operations described herein.

In an example embodiment, the processor 152 (or the processing circuitry 150) may be embodied as, include or otherwise control the business measurement matching and correlation engine 44, which may be any means such as a device or circuitry operating in accordance with software or otherwise embodied in hardware or a combination of hardware and software (e.g., processor 152 operating under software control, the processor 152 embodied as an ASIC or FPGA specifically configured to perform the operations described herein, or a combination thereof) thereby configuring the device or circuitry to perform the corresponding functions of the business measurement matching and correlation engine 44, as described herein.

In some embodiments, the apparatus 100 may operate based on a set of functional abstraction layers including, for example, a hardware and software layer, a virtualization layer, a management layer and/or a workload layer. In an example embodiment, the hardware and software layer may be provided via a plurality of hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2C® database software. (IBM, zSeries, pSeries, xSeries, BladeCenter, WebSphere, and DB2 are trademarks of International Business Machines Corporation registered in many jurisdictions worldwide). The virtualization layer may provide an abstraction layer from which the following examples of virtual entities may be provided: virtual servers; virtual storage; virtual networks, including virtual private networks; virtual applications and operating systems; and virtual clients. In one example, the management layer may provide any of a number of functions including, for example, resource provisioning metering and pricing, billing or invoicing, security user portal provides access, service level management, Service Level Agreement (SLA) planning and fulfillment, and/or the like. The workloads layer may provide examples of functionality for which the cloud computing environment may be utilized. Examples of workloads and functions which may be provided from this layer include provision of a tool for discovery and realization of business measurement concepts using industry models.

Operation of an example embodiment will now be described in reference to FIG. 3. FIG. 3 is a conceptual block diagram illustrating operation of an example embodiment. As shown in FIG. 3, the business measurement matching and correlation engine 44 may interact with a business measurement repository 200 to generate business and performance measurement indicators as described herein. In an example embodiment, the business measurement repository 200 may include data stored in the client 20, the database server 42 and/or application server 40. The data may be defined in glossaries relating to a plurality of topics. For example, the business measurement repository 200 may include a business entity glossary 210, a value chain glossary 212, an entity state glossary 214, a statistical parameter glossary 216, and a glossary or list of duration parameters 218.

An operator may interact with the business measurement matching and correlation engine 44 to provide input and/or feedback that can be used by the business measurement matching and correlation engine 44 to generate business and performance measurement indicators (e.g., KPIs) for the organization. In an example embodiment, the operator may select an entity from a list of possible entities within the business entity glossary 210 and/or provide information for use by the business measurement matching and correlation engine 44 to select a proposed entity to provide to the operator for verification based on identifying information provided by the operator. In some cases, attribute information may be provided by the operator and correlated to attributes associated with entities stored in the business entity glossary 210 to facilitate identification of a business entity that may be similar (or identical) to the organization for which the operator is trying to generate BPM tools. Each business entity in the glossary may be associated with a corresponding industry model or models (e.g., SID, IFW, HL7, ACORD, IEC-CIM, IS020022) or an enterprise information model. The entity of interest may be, for example, a customer order, a particular service, and/or the like.

The models may further be associated with value chain and/or business capability characteristics. Accordingly, the operator may either select value chain related characteristics that are applicable to the organization from the value chain glossary 212, or the business measurement matching and correlation engine 44 may be configured to select or otherwise suggest a taxonomy of business capabilities and processes that may be relevant to the entity selected from the business entity glossary 210. Thus, for example, the business measurement matching and correlation engine 44 may be configured to correlate a selected entity with attributes common to similar entities. The value chain of interest may define, for example, order management or any other applicable or desirable value chain.

The entity state glossary 214 may include possible states that entities may go through such as, for example, successful, failed, jeopardy, in progress, completed, delayed, received, and/or the like. In some cases, specific possible states may be associated with corresponding specific entities and/or value chain characteristics. Moreover, the business measurement matching and correlation engine 44 may be configured to provide a list of possible entity states to enable the operator to select those that are considered to be valid for the organization. This list may be tailored to the entity or value chain characteristics or may be a generic list. In other embodiments, the business measurement matching and correlation engine 44 may select and assign possible entity states based on the selected business model correlating to the entity. The operator may accept or modify selected and/or assigned entity states as appropriate.

The statistical parameter glossary 216 may include a plurality of statistical measures that may be used to measure progress relative to a goal, objective, KPI and/or the like. For example, statistical parameters may include an average value, a total value, a percentage, a quantity, a rate and/or the like. In some cases, specific statistical measures may be associated with corresponding specific entities, value chain characteristics, entity states, goals, objectives, KPIs and/or the like. Moreover, the business measurement matching and correlation engine 44 may be configured to provide a list of possible statistical parameters to enable the operator to select those that are considered to be valid for the organization. This list may be tailored to the organization based on information provided by the operator or may be a generic list. In other embodiments, the business measurement matching and correlation engine 44 may select and assign possible statistical parameters based on the selected business model correlating to the entity. The operator may accept or modify selected and/or assigned statistical parameters as appropriate.

The duration parameter glossary 218 may include a plurality of units, suffixes, and/or parametric modifiers that denote a temporal duration that may be associated with one or more of the statistical measures employed from the statistical parameter glossary 216, the value chain characteristics, or even an entity state. For example, duration parameters may include modifiers such as hour, per hour, minute, per minute, day, per day, year, per year, quarter, month, and/or the like. In some cases, the business measurement matching and correlation engine 44 may be configured to provide a list of possible duration parameters to enable the operator to select those that are considered to be valid for the organization relative to modifying other terms or values used to build a list of business and performance measurement indicators for the organization. This list may be tailored to the organization based on information provided by the operator or may be a generic list. As such, the operator may build in duration parameters where appropriate based on recommendations, or based on selecting values from among potential values provided in a list.

As such, parametric information from other glossaries may be mapped to likely glossary terms, objects or parameters to provide a suggested set of indicators that can be adopted in part, or in whole, by the operator. In some cases, the operator may receive a list of suggested parameters from a mapping of parameters to corresponding entities, value chain characteristics, entity states. For example, the operator may specify one or more entities of interest via an interface provided by the business measurement matching and correlation engine 44. Responsive to selection of one or more entities, the business measurement matching and correlation engine 44 may provide a corresponding list of value chain characteristics that are likely to correlate to the entity or entities selected. The operator may then specify or otherwise select one or more value chains of interest. The business measurement matching and correlation engine 44 may then provide recommendations or selectable options for various entity states, statistical parameters and/or duration parameters for the operator to select from in order to define industry benchmark data and/or operational data that will be useful as indicators applicable to goals having value for the organization. As such, the business measurement matching and correlation engine 44 may provide a series of interfaces (e.g., control consoles, web pages, drop down lists, menus, selectable options and/or the like) that step the operator through a methodology for discovering concepts used to define a measurement model that is applicable to the organization in a coherent manner. The business measurement matching and correlation engine 44 may then generate business and performance measurement indicators 240 that can be used for any BPM tool. The indicators 240 may be provided in any suitable format such as, for example, XML, Excel, comma separated values, etc.).

In some embodiments, the interfaces provided by the business measurement matching and correlation engine 44 may define survey questions, or a series of fields, and/or selectable options that enable the business measurement matching and correlation engine 44 to extract information needed to facilitate defining the measurement model, for example, by using measurement templates the correlate to specific business entities and/or value chain characteristics provided in one or more of the glossaries of the business management repository 200. Templates may be generated initially based on known or existing models associated with business entities that have been previously modeled. Thus, for example, one or more known models may be mapped to entities defined in the business entity glossary and corresponding templates may be generated based on the known models. The templates may be useful in providing a general guide that may be applicable to similar entities. However, given the possibility for variation in organizational structures, goals and values, the templates may be relatively flexible to allow operators to generate indicators for tracking that will be of particular use to the organization.

As such, the business management repository 200 may be populated using industry standard glossaries. The operator may step through a series of interfaces designed to extract information regarding the organization of the operator relative to the business data that is applicable to the organization. Measurement constructs that are applicable to the organization may therefore be generated in a flexible manner, but via a coherent process that can be repeated for a plurality of organizations using the same software to generate measurement models that are specific to the corresponding organizations. As an example, the interfaces may provide a mechanism by which to extract information on what type of entity a particular organization represents. Based on the type of entity, a template may be defined that includes various value chain characteristics (e.g., business deals) the organization may engage in. The template may be filled to some degree based on information defining the business deals in which the organization engages. The information on business deals may include an identity of the party with whom the business deals are conducted, and information descriptive of the business deal (e.g., type of transaction, date, etc.). Other information useful for determining measurement constructs may also be extracted via the interfaces (e.g., order fulfillment dates, duration parameters, use parameters, statistical data, status information, etc.). All of the information extracted via the interfaces may be used to formulate a set of context sensitive measurement concepts for a particular business process.

As an example, the operator may be able to generate measurement constructs to track the average number of successful customer orders per day by defining a "customer order" entity relating to an "order management" value chain that has a "successful" state parameter, "average number" statistical parameter, and "per day" duration parameter. Other measurement constructs that can be easily constructed, but which are non-limiting examples, may include defining a percentage of failed customer orders per month, defining a total number of customer orders received per month, defining a total number of on-time service activations per month, and/or the like.

In some embodiments, bootstrap glossaries may be provided to facilitate setup or modification of the business measurement repository 210. Thus, for example, the glossaries may be built and/or modified based on industry standard data. Moreover, in some cases, operators may be enabled to utilizing the business measurement matching and correlation engine 44 to define new glossary terms. The new terms may be added to the repository for future use (either locally or for any remote access to the business measurement repository 210. After operation of the business measurement matching and correlation engine 44 responsive to input provided by the operator to select glossary terms, generation of the business and performance measurement indicators 240 may be accomplished as described above.

From a technical perspective, the apparatus 100 described above may be configured accordingly to be used to support some or all of the operations described herein in relation to the business measurement matching and correlation engine 44. As such, the platform described in FIG. 2 may be used to facilitate the implementation of several computer program and/or network communication based interactions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A method according to one embodiment of the invention will now be described in reference to FIG. 4. The method may include providing at least one interface configured to receive an input from an operator associated with an organization at operation 300, and determining a selected set of glossary terms from a repository including a plurality of glossaries based at least in part on the input at operation 310. The glossaries may relate to different performance indicator components that are combinable to define a measurable performance indicator. The method may further include generating at least one performance indicator of the organization based on the selected set of glossary terms at operation 320.

In some embodiments, certain ones of the operations above may be modified or further amplified as described below. Moreover, in some embodiments additional optional operations may also be included (some examples of which are shown in dashed lines in FIG. 4). It should be appreciated that each of the modifications, optional additions or amplifications below may be included with the operations above either alone or in combination with any others among the features described herein. In this regard, in some embodiments the method may further include enabling export of the at least one performance indicator of the organization to a business performance management tool at operation 330. In some embodiments determining the selected set of glossary terms may include determining one component from each of the glossaries and combining components determined to form the at least one performance indicator. In an example embodiment, determining one component from each of the glossaries may include determining one component from each of a business entity glossary, a statistical parameter glossary, a value chain glossary, an entity state glossary, and a duration parameter glossary. In some cases, determining the selected set of glossary terms may include determining the selected set of glossary terms based on a summation of individual operator selections of each of the glossary terms selected. In an example embodiment, determining the selected set of glossary terms may include determining at least one glossary term based on operator selection from a list of candidate glossary terms, the list being generated based on at least one prior operator selection. In some embodiments, enabling export of the at least one performance indicator may include enabling export of the at least one performance indicator in an XML, Excel, or comma separated values format. In an example embodiment, providing the at least one interface comprises providing the at least one interface at a device employing the method responsive to operation of a cloud based resource.

In an example embodiment, an apparatus for performing the method of FIG. 4 above may comprise a processor (e.g., the processor 152) configured to perform some or each of the operations (300-330) described above. The processor may, for example, be configured to perform the operations (300-330) by performing hardware implemented logical functions, executing stored instructions, or executing algorithms for performing each of the operations.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A computer-implemented method comprising:
   setting up automated processes via a software product for automatically measuring and monitoring progress relative to organizational objectives and goals of an organization comprising:
   transforming a computing apparatus into a business measurement matching and correlation engine by configuring the computing apparatus to discover and realize business measurement concepts using industry models by executing the software product through the automated processes;
   receiving, via a series of interfaces, an input, specifying information about a business entity from an operator associated with the organization, at the business measurement matching and correlation engine by executing the software product through the automated processes, the business measurement matching and correlation engine being configured to provide and receive information associated with the organization by executing the software product through the automated processes;
   identifying, via the business measurement matching and correlation engine, the business entity that is similar to the organization for which the operator is generating business process management tools by executing the software product through the automated processes;
   correlating, via the business measurement matching and correlation engine, the information about the business entity with one or more value chain characteristics from a value chain glossary based on receiving the information about the business entity by executing the software product through the automated processes;
   providing, via the series of interfaces, a list of possible entity states selected from an entity state glossary based at least in part on the business entity and a selected value chain characteristic of the one or more value chain characteristics by executing the software product through the automated processes;
   determining, via the business measurement matching and correlation engine, a selected set of glossary terms correlated to at least one of the business entity, the selected value chain characteristic, and a selected entity state of the list of possible entity states from a plurality of glossaries, stored in a business measurements repository by executing the software product through the automated processes, the glossaries relating to different performance indicator components associated with at least one of the business entity, the value chain characteristic, and business-specific entity state that are combinable to define a measurable performance indicator;
   wherein the determining comprises:
   generating, via the business measurement matching and correlation engine, a partially pre-filled template on an electronic display device with a set of glossary terms correlated to the business entity, the value chain characteristic, and an entity state of the list of possible entity states by executing the software product through the automated processes, the partially pre-filled template being generated based on information associated with the business entity;
   providing, via the series of interfaces, the partially pre-filled template to the operator on the electronic display device for selection of the set of glossary terms, the value chain characteristic, and the entity state of the list of possible entity states by executing the software product through the automated processes; and
   generating measurement models that are specific to a particular one of a plurality of different business organizations by providing the operator, via the series of interfaces, with a process that can be repeated for the plurality of different business organizations to fill in a plurality of the partially pre-filled templates on the electronic display device, which partially pre-filled templates each respectively correspond to the different business organizations;
   generating, via the business measurement matching and correlation engine, a performance indicator of the organization based on the selected set of glossary terms by executing the software product through the automated processes; and
   exporting, via the business measurement matching and correlation engine, the performance indicator of the organization to a business performance management tool by executing the software product through the automated processes,
   wherein determining the selected set of glossary terms is performed based on operator selections associated with the partially pre-filled template provided to the operator for selection of the selected set of glossary terms, and
   wherein the plurality of glossaries stored in a business measurements repository are bootstrap glossaries configured to facilitate modification of the glossary terms stored in the plurality of glossaries by enabling the operator to define new glossary terms to be stored in the plurality of glossaries utilizing the business measurement matching and correlation engine by executing the software product through the automated processes.

2. The method of claim 1, wherein determining the selected set of glossary terms comprises determining one component from each of the glossaries and combining components determined to form the performance indicator.

3. The method of claim 2, wherein determining one component from each of the glossaries comprises determining one component from each of a business entity glossary, a statistical parameter glossary, the value chain glossary, the entity state glossary, and a duration parameter glossary.

4. The method of claim 1, wherein determining the selected set of glossary terms comprises determining the selected set of glossary terms based on a summation of individual operator selections of each of the glossary terms selected.

5. The method of claim 1, wherein determining the selected set of glossary terms comprises determining at least one glossary term based on operator selection from a list of candidate glossary terms, the list being generated based on at least one prior operator selection.

6. The method of claim 1, wherein providing the series of interfaces comprises providing the series of interfaces at a device employing the method responsive to operation of a cloud based resource.

7. An apparatus comprising processing circuitry, the processing circuitry being configured to:
  set up automated processes via a software product for automatically measuring and monitoring progress relative to organizational objectives and goals of an organization by performing steps to:
    transform a computing apparatus into a business measurement matching and correlation engine by configuring the computing apparatus to discover and realize business measurement concepts using industry models by executing the software product through the automated processes;
    receive, via a series of interfaces, a list of suggested parameters from a mapping of parameters corresponding to business entities, value chain characteristics which correlate to the business entities and entity states of the business entities;
    receive, via the series of interfaces, an input, specifying information about a business entity of the business entities from an operator associated with an organization, at the business measurement matching and correlation engine by executing the software product through the automated processes, the business measurement matching and correlation engine being configured to provide and receive information associated with the organization by executing the software product through the automated processes;
    identify, via the business measurement matching and correlation engine, the business entity that is similar to the organization for which the operator is generating business process management tools by executing the software product through the automated processes;
    correlate, via the business measurement matching and correlation engine, the information about the business entity with one or more value chain characteristics which correlate to the business entity from a value chain glossary based on receiving the information about the business entity by executing the software product through the automated processes;
    provide, via the series of interfaces, a list of possible entity states selected from an entity state glossary based at least in part on the business entity and a selected value chain characteristic of the one or more value chain characteristics by executing the software product through the automated processes;
    determine, via the business measurement matching and correlation engine, a selected set of glossary terms correlated to at least one of the business entity, the selected value chain characteristic, and a selected entity state of the list of possible entity states from a plurality of glossaries, stored in a business measurements repository by executing the software product through the automated processes, the glossaries relating to different performance indicator components associated with at least one of the business entity, the value chain characteristic, and business-specific entity state that are combinable to define a measurable performance indicator;
  wherein the determining comprises:
    generating, via the business measurement matching and correlation engine, a partially pre-filled template on the electronic display device with a set of glossary terms correlated to the business entity, the value chain characteristic, and an entity state of the list of possible entity states by executing the software product through the automated processes, the partially pre-filled template being generated based on information associated with the business entity;
    providing, via the series of interfaces, the partially pre-filled template to the operator on the electronic display device for selection of the set of glossary terms, the value chain characteristic, and the entity state of the list of possible entity states by executing the software product through the automated processes; and
    generating indicators for tracking that are of particular use to one of a plurality of different organizations by providing the operator, via the series of interfaces, with a process that can be repeated for the plurality of different business organizations to fill in a plurality of the partially pre-filled templates on the electronic display device, which partially pre-filled templates each respectively correspond to the different business organizations by executing the software product through the automated processes;
    generate, via the business measurement matching and correlation engine, at least one performance indicator of the organization based on the selected set of glossary terms by executing the software product through the automated processes; and
    export, via the business measurement matching and correlation engine, the performance indicator of the organization to a business performance management tool by executing the software product through the automated processes,
  wherein determining the selected set of glossary terms is performed based on operator selections associated with the partially pre-filled template provided to the operator for selection of the selected set of glossary terms, and
  wherein the plurality of glossaries stored in a business measurements repository are bootstrap glossaries configured to facilitate modification of the glossary terms stored in the plurality of glossaries by enabling the operator to define new glossary terms to be stored in the plurality of glossaries utilizing the business measurement matching and correlation engine by executing the software product through the automated processes.

8. The apparatus of claim 7, wherein the business measurement matching and correlation engine is configured to determine the selected set of glossary terms by determining one component from each of the glossaries and combining components determined to form the performance indicator.

9. The apparatus of claim 8, wherein the business measurement matching and correlation engine is configured to determine one component from each of the glossaries via determining one component from each of a business entity glossary, a statistical parameter glossary, the value chain glossary, the entity state glossary, and a duration parameter glossary.

10. The apparatus of claim 7, wherein the business measurement matching and correlation engine is configured to determine the selected set of glossary terms via determining the selected set of glossary terms based on a summation of individual operator selections of each of the glossary terms selected.

11. The apparatus of claim 7, wherein the business measurement matching and correlation engine is configured to determine the selected set of glossary terms via determining at least one glossary term based on operator selection from a list of candidate glossary terms, the list being generated based on at least one prior operator selection.

12. The apparatus of claim 7, wherein the business measurement matching and correlation engine being configured to export the performance indicator comprises the business measurement matching and correlation engine being configured to export the performance indicator in an XML, Excel, or comma separated values format.

13. The apparatus of claim 7, wherein the business measurement matching and correlation engine being configured to provide the series of interfaces comprises the business measurement matching and correlation engine being configured to provide the series of interfaces at a remote device responsive to operation of a cloud based resource.

14. A computer program product comprising a computer-readable hardware storage device having computer-executable program code instructions stored on the computer-readable hardware storage device, the computer-executable program code instructions comprising program code instructions for:

setting up automated processes, via a software product for automatically measuring and monitoring progress relative to organizational objectives and goals of an organization, the software product including the computer-executable program code instructions for:
transforming a computing apparatus into a business measurement matching and correlation engine by configuring the computing apparatus to discover and realize business measurement concepts using industry models by executing the software product through the automated processes;
receiving, via a series of interfaces, a list of suggested parameters from a mapping of parameters corresponding to business entities, value chain characteristics which correlate to the business entities and entity states of the business entities;
receiving, via the series of interfaces, an input, specifying information about a business entity from an operator associated with an organization, at the business measurement matching and correlation engine by executing the software product through the automated processes, the business measurement matching and correlation engine being configured to provide and receive information associated with the organization;
identifying, via the business measurement matching and correlation engine, the business entity that is similar to the organization for which the operator is generating business process management tools by executing the software product through the automated processes;
correlating, via the business measurement matching and correlation engine, the information about the business entity with one or more value chain characteristics from a value chain glossary based on receiving the information about the business entity by executing the software product through the automated processes;
providing, via the series of interfaces, a list of possible entity states selected from an entity state glossary based at least in part on the business entity and a selected value chain characteristic of the one or more value chain characteristics by executing the software product through the automated processes;
determining, via the business measurement matching and correlation engine, a selected set of glossary terms correlated to at least one of the business entity, the selected value chain characteristic, and a selected entity state of the list of possible entity states from a plurality of glossaries, stored in a business measurements repository by executing the software product through the automated processes, the glossaries relating to different performance indicator components associated with at least one of the business entity, the value chain characteristic, and business-specific entity state that are combinable to define a measurable performance indicator;
wherein the determining comprises:
generating, via the business measurement matching and correlation engine, a partially pre-filled template on the electronic display device with a set of glossary terms correlated to the business entity, the value chain characteristic, and an entity state of the list of possible entity states by executing the software product through the automated processes, the partially pre-filled template being generated based on information associated with the business entity;
displaying, via the series of interfaces, the partially pre-filled template on the electronic display device to the operator for selection of the set of glossary terms, the value chain characteristic, and the entity state of the list of possible entity states by executing the software product through the automated processes; and
generating measurement models that are specific to a particular one of a plurality of different organizations by providing the operator, via the series of interfaces, with a process that can be repeated for the plurality of different business organizations to fill in a plurality of the partially pre-filled templates on the electronic display device by executing the software product through the automated processes, which partially pre-filled templates each respectively correspond to the different business organizations;
generating, via the business measurement matching and correlation engine, a performance indicator of the organization based on the selected set of glossary terms by executing the software product through the automated processes; and
exporting, via the business measurement matching and correlation engine, the performance indicator of the organization to a business performance management tool by executing the software product through the automated processes,
wherein determining the selected set of glossary terms is performed based on operator selections associated with the partially pre-filled template provided to the operator for selection of the selected set of glossary terms, and
wherein the plurality of glossaries stored in the business measurements repository are bootstrap glossaries configured to facilitate modification of the glossary terms stored in the plurality of glossaries by enabling the operator to define new glossary terms to be stored in the plurality of glossaries utilizing the business measurement matching and correlation engine by executing the software product through the automated processes.

15. The computer program product of claim 14, wherein program code instructions for determining the selected set of glossary terms include instructions for determining one component from each of the glossaries and combining components determined to form the performance indicator.

16. The computer program product of claim 15, wherein program code instructions for determining one component from each of the glossaries include instructions for determining one component from each of a business entity glossary, a statistical parameter glossary, the value chain glossary, the entity state glossary, and a duration parameter glossary.

17. The computer program product of claim 14, wherein program code instructions for determining the selected set of glossary terms include instructions for determining the selected set of glossary terms based on a summation of individual operator selections of each of the glossary terms selected.

18. The computer program product of claim 14, wherein program code instructions for determining the selected set of glossary terms include instructions for determining at least one glossary term based on operator selection from a list of candidate glossary terms, the list being generated based on at least one prior operator selection.

19. The computer program product of claim 14, wherein program code instructions for providing the series of interfaces include instructions for providing the series of interfaces at a device employing the method responsive to operation of a cloud based resource.

20. The method of claim 1, wherein the at least one series of interfaces is further configured to provide a list of the one or more value chain characteristics in response to the input specifying the business entity.

21. The method of claim 1, wherein the determining the selected set of glossary terms is based at least in part on a template previously generated for the business entity and the selected value chain characteristic.

22. The method of claim 1, wherein the series of interfaces is further configured to receive modification of the performance indicator from the operator before export to the business performance management tool.

23. The method of claim 21, further comprising automatically filling at least a portion of the template based at least in part on information regarding the organization.

24. The method of claim 21, further comprising generating the template based at least in part on a previously generated model mapped to the business entity in one of the plurality of glossaries.

* * * * *